United States Patent

[11] 3,608,017

| [72] | Inventor | Martin R. Cines<br>Bartlesville, Okla. |
|---|---|---|
| [21] | Appl. No. | 646,882 |
| [22] | Filed | June 19, 1967 |
| [45] | Patented | Sept. 21, 1971 |
| [73] | Assignee | Phillip Petroleum Company |

[54] METHOD FOR PRODUCING A BLOWN ORIENTED CONTAINER WITH AN OPENING AT AN ANGLE WITH THE MAJOR AXIS OF THE CONTAINER
7 Claims, 5 Drawing Figs.

| [52] | U.S. Cl................................................ | 264/89, 18/5, 215/1, 264/94 |
|---|---|---|
| [51] | Int. Cl................................................ | B29c 17/07 |
| [50] | Field of Search................................... | 264/89, 94, 97, 98; 18/5 BK, 5 BZ |

[56] References Cited

UNITED STATES PATENTS

| 2,003,707 | 6/1935 | De Witt.......................... | 264/94 X |
| 3,106,745 | 10/1963 | King................................ | 18/5 BK |
| 3,311,684 | 3/1967 | Heider............................. | 18/5 BK X |
| 3,319,291 | 5/1967 | Schaich.......................... | 264/98 X |
| 3,390,426 | 7/1968 | Turner et al. ................... | 264/98 X |
| 1,877,629 | 9/1932 | Replogle ........................ | 264/94 |

FOREIGN PATENTS

| 443,466 | 12/1948 | Italy ................................ | 264/94 |
| 1,295,535 | 5/1962 | France ........................... | 264/98 |

Primary Examiner—Robert F. White
Assistant Examiner—J. H. Silbaugh
Attorney—Young & Quigg ABSTRACT: A parison, after proper temperature conditioning is stretched by being grasped at both ends and moving the ends of the parison apart relative to one another. The bottom end of the parison is closed and the top end is grasped in a molding device. A small amount of air is introduced into the parison to partially inflate it. One clamping unit is moved at an angle from about 15° up to 90° relative to the other in one plane. The stretched parison is then in proper position between the mold halves which subsequently close. Full air pressure is then admitted to finish the forming of a biaxially oriented container having an opening at an angle from 15° to 90° with the principal axis of the container.

INVENTOR.
M. R. CINES
BY Young & Quigg
ATTORNEYS

INVENTOR.
M. R. CINES
BY Young and Quigg
ATTORNEYS

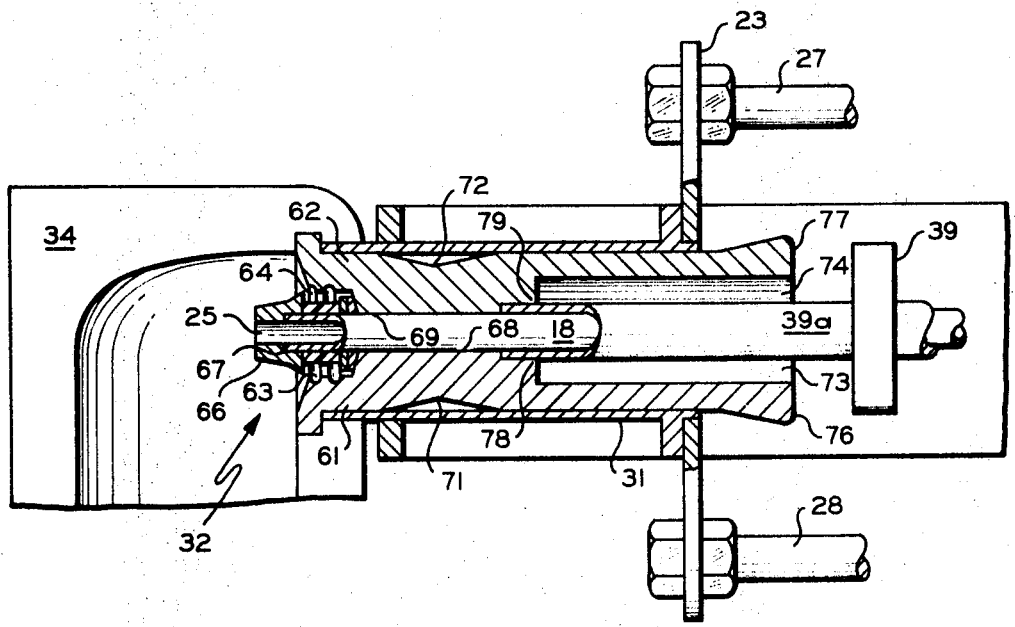
FIG. 3
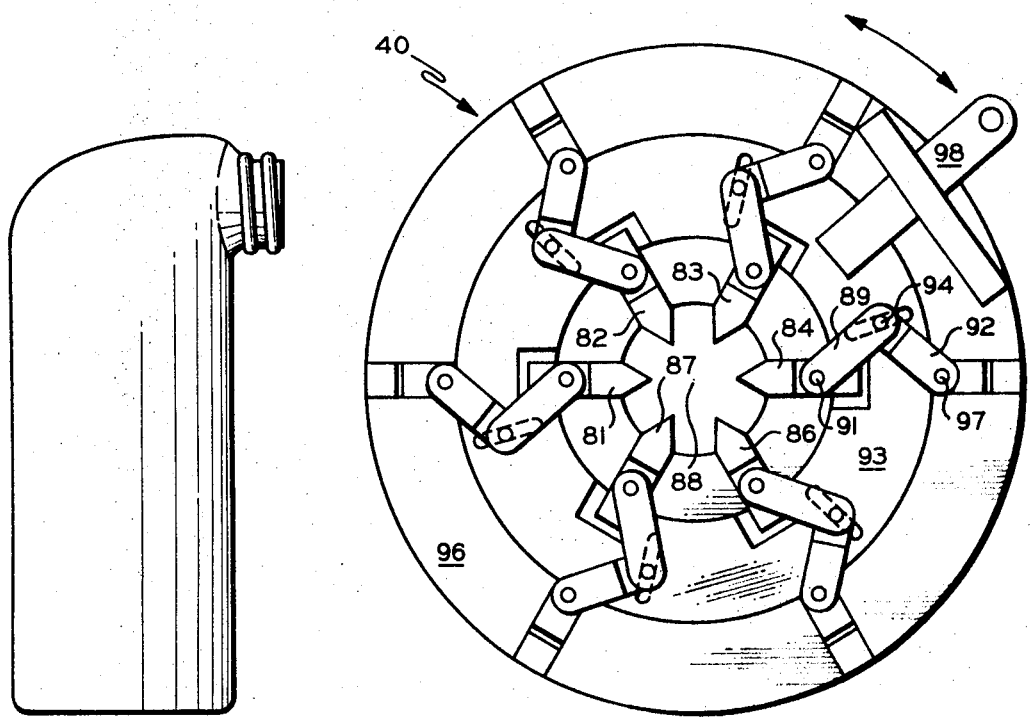
FIG. 4
FIG. 5
INVENTOR.
M. R. CINES
BY Young & Quigg
ATTORNEYS

METHOD FOR PRODUCING A BLOWN ORIENTED CONTAINER WITH AN OPENING AT AN ANGLE WITH THE MAJOR AXIS OF THE CONTAINER

This invention relates to molding hollow articles. In one aspect, it relates to blow molding hollow articles having an opening at an angle from about 15° up to 90° with the principal axis of the article. In another aspect it relates to a process for forming a biaxially oriented article having an opening at an angle from about 15° up to 90° with the principal axis of the article.

Blow molded articles are known in the art. In the copending application of Turner et al., Ser. No. 489,934, now U.S. Pat. No. 3,390,426, and incorporated herein, a process and apparatus are disclosed for blow molding articles that can be biaxially oriented by stretching the parison axially or providing a constant axial tension on the parison as it is blow molded to fill the mold. However, processes and apparatus are constantly being sought for producing blow molded biaxially oriented articles wherein the opening in the article is removed at an angle from the principal axis of the article. By the process and apparatus of this invention a biaxially oriented blow molded article can be produced by guiding the stretched parison to cause the ends of the parison to be moved at an angle from about 15° up to 90° relative to each other in one plane and maintaining the constant tension on the parison as it is blow molded to fill the mold. The article produced by the present invention is superior to those produced by known methods in that the article is biaxially oriented and thus provides strength and clarity to an article not heretofore available in a similar design.

An object of this invention is to provide a method for producing a biaxially oriented, blown plastic article having an opening at an angle from about 15° up to 90° of the principal axis of said article.

Other aspects, objects, and the advantages of this invention will be apparent to one skilled in the art from a study of the written disclosure, the drawing, and the appended claims.

According to the present invention, a biaxially oriented, hollow article having an opening at an angle from about 15° to 90° of the principal axis of said article is made by maintaining a constant tension on a hollow parison and moving the upper portion of the parison to form the opening at the desired angle before the parison is expanded rapidly into a mold cavity. Prior to the blowing operation, the stretched parison is partially inflated and while the neck forming means is withdrawn to provide a constant tension on the parison, the upper portion of the parison is also positioned at the desired angle with the principal axis of the article thereby providing an opening at the desired angle.

The invention can be best understood by reference to the accompanying drawings.

FIG. 3 is a partial sectional view of the parison molding and handling apparatus of FIG. 1 rotated 90° with respect to the mold.

FIG. 4 is an article having an opening at an angle of 90° from the principal axis of the article produced by the apparatus of FIGS. 1 and 2.

FIG. 5 is a view of the pinch off device of FIG. 1 in an open position.

Figure 1:
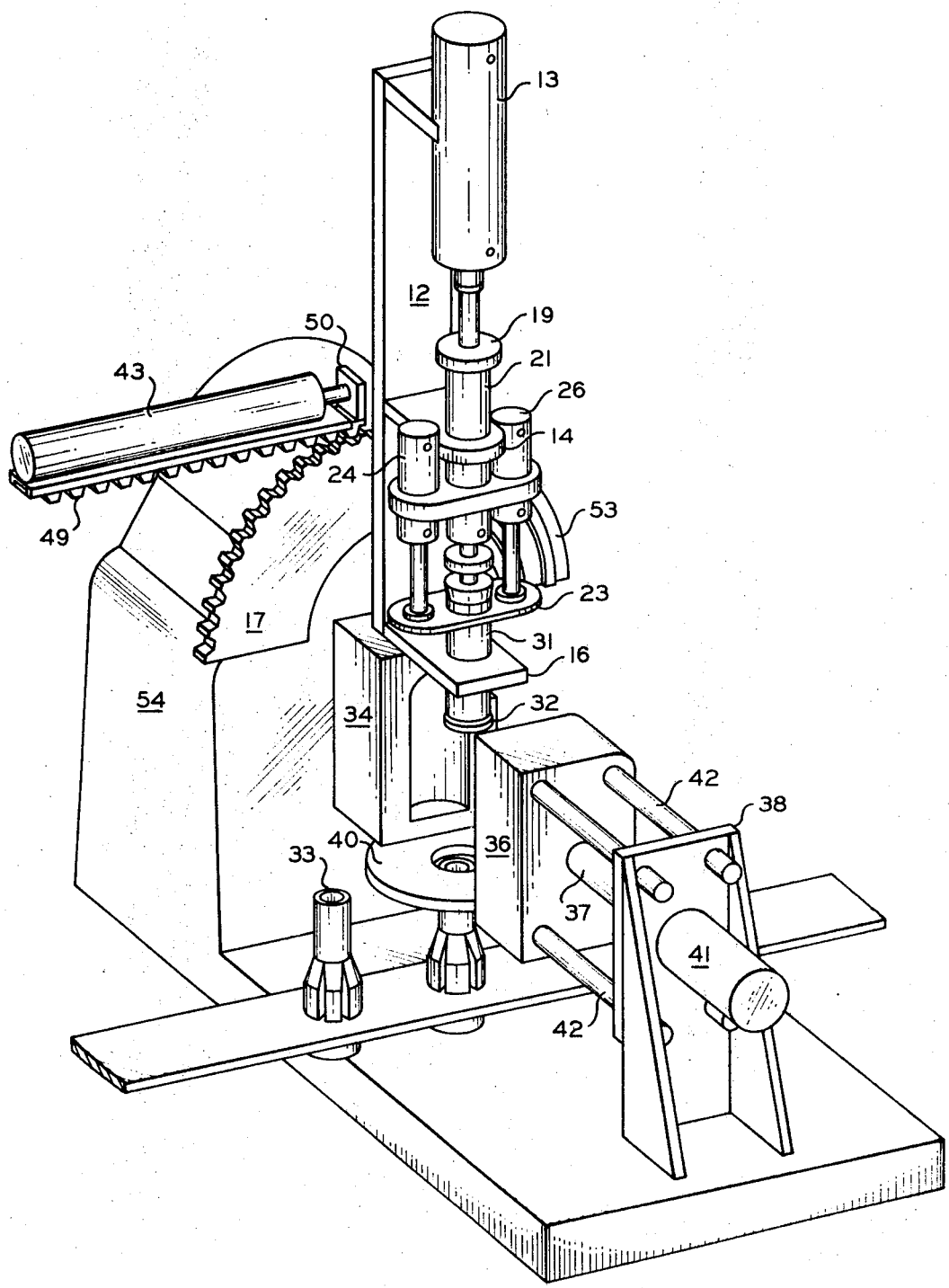
FIG. 1 is an isometric view of an apparatus according to the invention for forming blow molded hollow containers having an opening at an angle from about 15° to 90° of the principal axis of the article.
Figure 2:
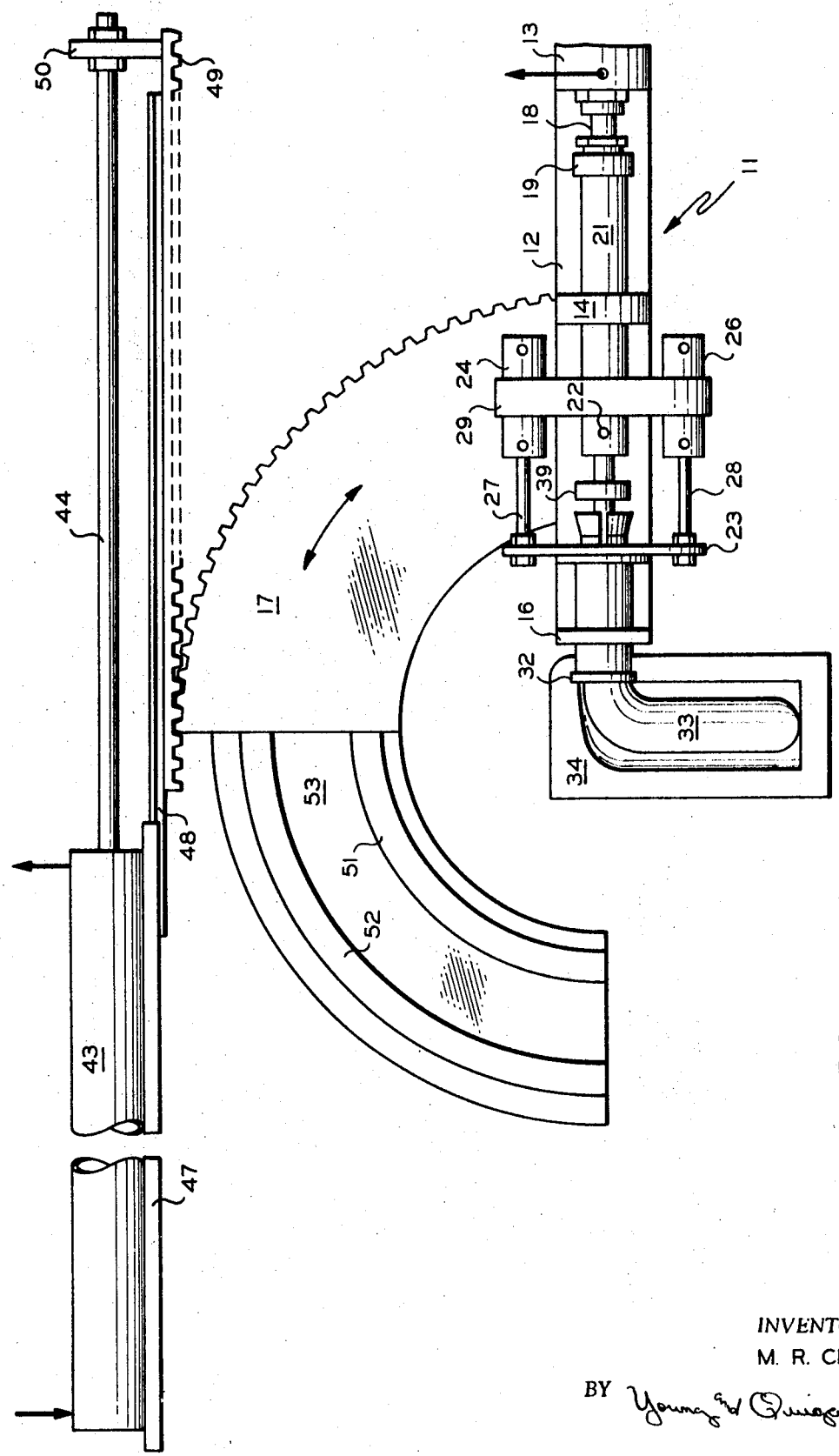
FIG. 2 is an elevation of the apparatus of FIG. 1 where the apparatus has been rotated 90° with respect to the mold.

Referring now to the drawings, and especially FIGS. 1 and 2, an apparatus suitable for the molding of a blown, biaxially oriented plastic article having an opening at an angle from about 15° to 90° from the principal axis of the article is generally designated by 11. The blowing apparatus 11 is supported on a frame 12 which can be any suitable structural shape such as an I-beam. Air cylinder 13, guide block 14, and guide member 16 are attached to frame 12. Gear sector 17 is attached to frame 12 by any suitable means such as bolts (not shown).

Air cylinder 13 is provided with a shaft 18 which is attached to guide tube 21. Shaft 18 is provided with a collar 19 which is adjustably attached and restricts the downward movement of guide tube 21. Guide tube 21 houses air inlet tube 25 (shown in FIG. 5) and is provided with an opening 22 through which fluid is introduced in order to support the parison during the stretching and molding operation. Guide tube 21 is slidably attached through guide block 14. Plate member 23 is rigidly attached to cam tube 31. Double acting air cylinders 24 and 26 are attached through block mount 29 and are provided with shafts 27 and 28 which are attached to plate member 23 by any suitable means. Plate member 23 is attached to cam tube 31 which is slidably attached to guide member 16. Cam tube 31 is provided with a chuck assembly generally designated as 32 which is employed to grasp the upper end of parison 33 in order to stretch the parison in the desired manner.

A reciprocating shaft member 37 rigidly attached to mold half 36 is likewise slidably affixed through frame element 38 and operates in response to a double acting air cylinder 41 so as to close mold half 36 around parison 33 after parison 33 has been stretched by the operation of the assembly and prior to inflation of parison 33 to fill the mold forms in mold halves 34 and 36. Mold half 34 is closed around parison 33 in response to a corresponding air cylinder, not shown. Guide member 42 is rigidly affixed to mold half 36 and slidably affixed to frame element 38 to support mold half 36 when operating in response to air cylinder 41. Pinch off means, generally designated by 40, is carried by the lower exterior portion of mold half 34. A preconditioned parison 33 is positioned in pinch off 40 by means not shown, which, when activated pinches off and seals parison 33 at its lower end. Referring now to FIG. 5, pinch off means 40 will be described in more detail.

Pinch off means 40 comprises six jaws, 81, 82, 83, 84, 86, and 87 which are arranged in a plane perpendicular to the longitudinal axis of parison 33. Each jaw reciprocates axially in the plane toward and away from point 88, which, preferably is the central longitudinal axis of parison 33. Each jaw is preferably separated by an angle of 60° and around point 88 in the plane of the jaws. Each jaw contains a 60° inclined angle tip which when coacting with the other jaws function to seal off parison 33 so that all points of the seal area tend to draw toward a point at 88. Jaws 81, 82, 83, 84, 86, and 87 are activated by three pin toggle arrangement attached to each jaw. For example, toggle member 89 is pivotably attached at 91 to jaw 84 and is pivotably attached to toggle member 92 and ring member 93 at pin 94. Toggle member 92 is pivotably attached to fixed structure 96 at 97. An actuating bar member 98 is fixedly attached to ring member 93, which is rotatable about point 88 with respect to fixed structure 96.

In operation, actuating bar member 98 is reciprocated by suitable means, such as an air cylinder (not shown) in the direction indicated by the arrow, whereupon ring member 93 rotates about point 88. The rotary movement causes toggle members 89 and 92 to be angularly displaced, thus pulling jaw 84 away from central point 88. The action is reversed to cause jaw 84 to approach central point 88.

Referring again to FIGS. 1 and 2, gear sector 17 is rigidly affixed to frame 12 by suitable means, such as bolts. A hydraulic or air cylinder 43 having a shaft 44 is affixed to frame 54 by means not shown. An adjustable stop (not shown) attached to frame 54 limits the travel of shaft 44 of air cylinder 43 and guide means 48 in order to allow adjustments to be made in the length of the stroke of the cylinder. Toothed rack 49 is slidably affixed to the lower portion of support 47 and rigidly affixed to guide means 48 so that as the double acting hydraulic cylinder moves shaft 44 and thus guide means 48 and rack 49, the teeth in rack 49 mesh with the teeth on gear sector 17 thus causing gear sector 17 to be moved along T-shaped guide rails 51 and 52. Support member 50 is fixably attached to rack 49 at the end farthest removed from air cylinder 43 and support member 50 is likewise adapted to support shaft 44 as can be seen in the drawing. Plate 53 carrying guide rails 51 and 52 is rigidly affixed to machine housing 54. As gear sector 17 moves along T-shaped guide rails 51 and 52 frame 12 which is connected to gear sector 17 likewise moves thereby causing the molding apparatus 11 to be moved as can be seen in FIG. 2 up to an angle of 90°.

Referring now to FIG. 3 a partial sectional view of the parison molding and handling apparatus of FIG. 1 rotated 90° with respect to the mold is illustrated. Movable jaws 61 and 62 are provided with thread forming die 63 and 64. According to the invention, there can be two or more of these movable jaw members 61 and 62. Preferably, there will be three movable jaw members. As shown in FIG. 3, the lowermost portions of the movable members 61 and 62 are flush with the innermost surface of mold halves 34 and 36. In other words, the lowermost portions of movable jaw members 61 and 62 form a continuous surface with the inner surface of mold halves 34 and 36. A tapered guide tip 66 is provided on the end of air inlet tube 67 for guiding the parison in place and keeping the parison walls apart. The middle portion of movable jaw members 61 and 62 are provided with groove surfaces 68 and 69 which conform to the shape of the outer portion of air inlet tube 67. Members 61 and 62 are recessed at 71 and 72 in the outer central portion. The uppermost portion of movable jaw members 61 and 62 are provided on the inner surface with recessed annular portions 73 and 74 and outwardly extending portions 76 and 77. It can be seen that unless constrained, the movable jaw members 61 and 62 can pivot around points 78 and 79. Movable members 61 and 62 are retained on the central shaft by cam tube 31 in which members 61 and 62 are adapted to slide axially. Collar 39 is adjustable on spacer-fulcrum tube 39a to restrict the upward movement of cam tube 31.

In operation the apparatus is in position as shown in FIG. 1. Conditioned polypropylene parisons 33 are heated to a temperature within the range of 300° F. to 350° F. and are fed to the apparatus by any suitable means such as a conveyor belt and raised to proper position by means not shown. The conditioned parisons are grasped by pinch off means 40 (hereinbefore described) closing one end of the parison and maintaining the parison in proper position for the next sequence. Air cylinder 13 is activated thus moving shaft 18 and guide tube 21 in a downward direction. Simultaneously, air cylinders 24 and 26 are activated moving plate member 23 and cam tube 31 in an upward direction. Cam tube 31 moves, slidably opening the jaws of chuck means 32. Shaft 18 continues its downward movement until the open jaws of chuck means 32 encircle the upper end of conditioned parison 33. Air cylinders 24 and 26 are again activated to move shafts 27 and 28 and cam tube 31 in a downward direction forcing the jaws 61 and 62 to close around the conditioned parison 33 which forms the threaded neck of the container by compression molding. Shaft 18 is retracted by air cylinder 13 thereby stretching and orienting the conditioned parison. A fluid, such as air, having a pressure within the range of 1 to 15 lbs. p.s.i. is introduced into the grasped parison through opening 22 and air inlet passage 25 in shaft 18. The air introduced is sufficient to preblow and maintain the shape of the parison during the stretching operation. The preblowing step is necessary in the formation of biaxially oriented articles having an opening at an angle of from 15° to 90° from the principal axis in order to prevent collapse and folding of the parison during the positioning step. Simultaneously, air cylinder 43 is activated moving rack 49 against gear sector 17 thus moving the entire assembly 11 in an arc around slidable guides 51 and 52 to any desired angle from the principal axis from about 15° up to 90° as shown in FIG. 2. After assembly 11 has reached the desired position, mold halves 34 and 36 are closed simultaneously around chuck assembly 32 and against the bottom of parison 33 by air cylinder 41 and a corresponding cylinder, not shown. Additional air in the amount ranging from 5 to 200 lbs. p.s.i. is inserted through opening 22 and air inlet passage 25 in shaft 18 to expand the parison and form the biaxially oriented container against the walls of mold members 34 and 36. After a sufficient cooling period has elapsed to allow the container to become rigid, the mold halves 34 and 36 separate, air cylinders 24 and 26 are activated to retract shafts 27 and 28 and open chuck means 32 to allow the container to be removed. Air cylinder 43 then retracts shaft 44 thus returning the entire assembly to the vertical position as shown in FIG. 1.

In carrying out the invention, it is desirable to maintain a ratio of actual expansion to circumferential expansion in the range of 1:4 to 2:1, preferably in the range of 1:2 to 1:1. The circumferential expansion ratio should be in the range of 2:1 to 10:1 and the axial expansion ratio should be in the range of at least 1:1 to 8:1, preferably 1.5:1 to 2.5:1.

It has been found that b stretching the parison axially as it is blown and expanded circumferentially, the blowing time, and thus the residence time of the parison in a blow mold can be decreased many fold. Further, it has been found that by moving the upper portion of the parison to the desired angle for producing the bottle, such as 45°, or 90°, the article having the opening at the desired angle is produced.

The parisons used in the apparatus of the invention were preformed and preheated to a temperature just below the crystalline melt temperature of the material. A suitable temperature for polypropylene resins would be in the range of 300°–350° F., preferably in the range of 320°–340° F.

EXAMPLE

A 0.91 density polypropylene having a melt flow of 1.05 (ASTM D 1238–57T Condition L) is formed into a 0.87-inch diameter tube 3¼ inches long and having a wall thickness of 0.12 inch over most of its length. The end of this tube on which the threads are to be formed has a wall thickness of 0.09 inch for a distance of 0.5 inch from the end. The tube is inserted into an electrically heated aluminum block and heated to about 324° F. It is then placed into the pinch off means and between the mold halves. The pinch off means are then activated to close the lower end of the tube and also to maintain the parison in a proper position. The air cylinders operating the chuck assembly are then activated and the chuck assembly grasps the upper end of the tube. The chuck assembly is then raised while, at the same time being rotated 90° through the movement of the gear sector. Preblow air is introduced during the stretching and rotating operation. The stretched tube is held in this position and the mold halves are closed. The tube is then blown to the shape of the mold cavity. The mold is then opened, the chuck assembly unclamped, and the bottle removed. A biaxially oriented polypropylene bottle cylindrically shaped having its opening at a 90° angle with the bottle's principal axis results. Further, the bottle so formed has a high degree of clarity.

Although the invention has been described in considerable detail, it is to be understood that such detail is for the purpose of illustration only. It is apparent that many variations and modifications can be made without departing from the spirit and scope of the invention.

What is claimed is:

1. A method for molding a biaxially oriented blown plastic article having an opening at an angle from about 15° to 90° of the principal axis of said article comprising:
   a. heating a parison to a temperature near to, but below, its crystalline melting point to form a pretreated parison;
   b. grasping one end of said pretreated parison with thread producing means;
   c. grasping the other end of said pretreated parison to seal it off;
   d. stretching said parison to axially orient said parison;
   e. introducing air into said pretreated parison to partially inflate said parison;
   f. thereafter guiding said thus stretched and partially inflated parison to cause the ends of said parison to be moved from 15° to 90° relative to each other in one plane;
   g. closing a pair of mold halves around said parison to form a mold cavity; and h. maintaining tension on said stretched parison while creating a differential pressure between the inner portion and the outer portion of said parison so that said parison will expand to fill the mold cavity.

2. The process of claim 1 wherein the steps of stretching said parison and guiding said parison to cause the ends of said parison to be moved from 15° to 90° relative to each other in one plane are conducted simultaneously.

3. A process according to claim 1 wherein said parison is heated to a temperature in the range of about 320° to 340° F. to form a pretreated parison and said parison comprises polypropylene.

4. The method of claim 1 wherein a pressure within the range of about 1 to 15 lbs. p.s.i. is introduced into said parison to partially inflate said parison.

5. The method of claim 1 wherein said ends of said parison are moved 90° relative to each other in one plane.

6. The method of claim 1 wherein air is introduced into the inner portion of said parison thereby causing the parison to expand by internal fluid pressure to fill the mold cavity.

7. A method according to claim 1 wherein said stretching of (d) and partial inflation of (e) are carried out simultaneously.